US006985735B2

(12) United States Patent
Gustafsson

(10) Patent No.: US 6,985,735 B2
(45) Date of Patent: Jan. 10, 2006

(54) METHOD AND SYSTEM FOR PLANNING AND EVALUATION OF CDMA RADIO NETWORKS

(75) Inventor: Nils Anders Stefan Gustafsson, The Hague (NL)

(73) Assignee: Koninklijke KPN N.V., Groningen (NL)

( * ) Notice: Subject to any disclaimer, the term of this patent is extended or adjusted under 35 U.S.C. 154(b) by 411 days.

(21) Appl. No.: 10/238,504

(22) Filed: Sep. 9, 2002

(65) Prior Publication Data

US 2003/0087641 A1 May 8, 2003

(30) Foreign Application Priority Data

Sep. 10, 2001 (EP) ................................ 01203391
Jan. 14, 2002 (EP) ................................ 02075071

(51) Int. Cl.
*H04Q 7/20* (2006.01)

(52) U.S. Cl. ...................................... 455/446; 455/449

(58) Field of Classification Search ................ 455/446, 455/449, 67.11, 423, 424
See application file for complete search history.

(56) References Cited

U.S. PATENT DOCUMENTS

| | | | | |
|---|---|---|---|---|
| 5,710,758 | A | 1/1998 | Soliman et al. | |
| 6,094,580 | A | 7/2000 | Yu et al. | |
| 6,853,845 | B2 * | 2/2005 | Hsu et al. .................. | 455/449 |

OTHER PUBLICATIONS

Wacker et al, "Static Simulator for Studying WCDMA Radio Network Planning Issues", Vehicular Technology Conference, Houston, TX, USA May 16-20, 1999, pp. 2436-2444.

P. Menolascino, "Storms Project Final Report", A016/CSE/MRM/DR/P/091/A1, Apr. 1999, pp. i-27, XP002194512.

* cited by examiner

*Primary Examiner*—Nguyen Vo
*Assistant Examiner*—Julie E Stein
(74) *Attorney, Agent, or Firm*—Michaelson & Associates; Peter L. Michaelson

(57) ABSTRACT

Method and system for the planning and/or evaluation of radio networks, especially CDMA radio networks. The service area of a radio network is divided into pixels after which for each pixel a probability is determined whether it is covered by a cell of the radio network. To account for cell breathing due to traffic changes, the planning involves the calculation of a link budget for each pixel and of a noise rise for each cell.

45 Claims, 11 Drawing Sheets

Non-overlapping cells

Overlapping cells

METHOD AND SYSTEM FOR PLANNING AND EVALUATION OF CDMA RADIO NETWORKS

A. BACKGROUND

1. Field of the Invention

The invention relates to a method and system for planning and evaluation of radio networks. More specifically, the invention relates to a method and system for planning and evaluation of CDMA radio networks comprising at least one base station that defines at least one cell.

2. Background

In recent years the concept of wideband code division multiple access (CDMA) has gained widespread international acceptance by operators active in the field of wireless communications. CDMA can significantly increase the capacity and the service quality and options of the networks as exploited by these operators.

One of the consequences of this development is the increase in interest in the planning and evaluation of radio networks in general and CDMA radio networks in particular. Radio planning and evaluation typically involves stages such as dimensioning, detailed capacity and coverage planning and network optimisation. Radio planning is important for e.g. quick and accurate response to changes in e.g. traffic conditions and as a consequence provides an operator with competitive advantages. Moreover accurate planning can contribute to higher cost efficiency in operating radio networks. The dimensioning stage in radio planning involves the estimation of the number and configuration of network elements, based on the operators' requirements and the radio propagation in the area. In the capacity and coverage planning stage base station locations, configurations and parameters are determined in more detail on the basis of e.g. real propagation data and estimated user density and traffic. In the network optimisation stage the overall experienced network quality is assessed and improved if necessary. The method and system according to the invention can be used in all stages of the radio planning and evaluation.

At present the most popular and widely used method for the planning and evaluation of CDMA radio networks is a static Monte-Carlo simulation. This simulation involves the random generation of multiple network states defined by the number of users of the network and their positions. Users are generated a number of times. The multiple states are analysed and the results of the analysis are evaluated. From the statistics results such as the maximum cell capacity and the cell coverage can be determined. An important drawback of the Monte-Carlo and other simulations is the required time to obtain reliable results. Moreover the known simulation methods do not possess the ability to quickly optimise a network or introduce a new site and see its effects on the radio network.

B. SUMMARY

It is an aim of the invention to improve the existing simulation methods for planning and/or evaluation of CDMA radio networks by focusing on an analysis, preferably a direct statistical analysis, of the radio network. The analysis speeds up the planning and evaluation process by splitting of a number of tasks. These tasks can be performed in advance and the results can be tabulated. According to an aspect of the invention a method and system are provided for the planning and/or evaluation of radio networks comprising at least one base station defining at least one cell. In an aspect of the invention the method and system relate to the division of at least part of at least one service area of the radio network into pixels. In order to obtain information on the coverage by the radio network according to the invention it is determined which of the pixels are covered by the at least one cell. Preferably a probability is determined whether or not at least one of the pixels is covered by the at least one cell.

In another aspect of the invention the pixels are divided into layers. Preferably a probability is determined whether or not at least one of the layers is covered by the at least one cell.

According to an embodiment of the invention, in order to reduce the number of pixels for which the coverage by the at least one cell is to be evaluated, cells are preferably initially assigned to a pixel before starting the planning and/or evaluation process to obtain coverage information. According to another embodiment of the invention a method and system are provided for planning and/or evaluation of a CDMA radio network comprising at least one base station defining at least one cell. The method and system relate to dividing at least part of a service area of the CDMA radio network into pixels and determining a probability whether or not the pixels are covered by the at least one cell.

According to another embodiment of the invention a link budget L and noise rise κ are calculated for the at least one pixel and the at least one cell respectively and are used in the planning and/or evaluation of the CDMA radio network, taking traffic, i.e. activity of user terminals in the at least one pixel, into account. Advantageously the results of the calculations are put in a table, but might be evaluated analytically when possible. By comparing the link budget L and the noise rise κ, or a function of at least L and κ, e.g. f(L-κ) f(L,κ, . . . ) or an alternative function of L and κ, with e.g. a certain number, coverage information of the at least one pixel by the at least one cell can be obtained. One basically compares the margin in the link budget, that is the additional average transmission power available, with the noise rise κ as a consequence of user terminal activity in a certain coverage area. In an embodiment of the invention several effects might be taken into account, such as inter-cell interference and soft handover (HO) gain.

According to another embodiment of the invention the calculations can be performed iteratively. However in order to obtain a sufficient first coverage estimate iterative calculations might not be necessary at all times. The iterations can be used to refine the first estimate.

An advantage of the algorithm employed by an embodiment of the method and system is that the trade-off between complexity and accurateness can be chosen quite freely. A rough estimate of the coverage of a loaded system can be obtained very easily and with relatively few calculations. This estimate can be improved by incorporating more details in the model, for example to model the effects of soft HO, and by taking inter-cell interference into account in a more precise way through an iterative process.

According to another embodiment of the invention the results of performing the algorithm can be used to determine the power headroom for a user in a pixel and to perform missed traffic calculations.

The method and system use pixels that preferably correspond to particular geographical areas. The service area of the radio network is divided into a grid consisting of such pixels for the planning and/or evaluation purposes. More service areas, i.e. areas where the operator of the radio network wants to provide services to users, can be present as well. A pixel e.g. measures 500 times 500 meters, preferably 250 times 250 meters, more preferably 100 times 100 meters, even more preferably 50 times 50 meters or 25 times 25 meters. It should be noted that these pixels should not necessarily be squares, but can basically take any form or shape, such as but not limited to rectangles, triangles, polygons etc. Moreover the pixels not necessarily fit to each other, but open spaces between several pixels can be present. For each pixel a prediction is made of the propagation path loss between the pixel and the relevant base station(s) of the radio network. For each pixel information of the traffic density is assumed to be known.

A cell is defined as the area that is served by one particular base station. Base stations often do not employ omni directional antennae, but use antenna sectorization instead. In that case a cell is defined as the service area covered by a particular sector of a base station, i.e. the area in which the user is connected to that sector. Pixels that are defined for the planning and/or evaluation purposes might be covered by more cells. Each pixel can have an own set of layers. Layers can be regarded as a set of individual pixels with the same geographical position but different sets of parameters characterizing the environment and the service for a user in the particular layer. Furthermore, each layer can have its own traffic distribution.

Compared to e.g. GSM radio networks, CDMA radio networks are more complex. One of the main reasons behind this complexity is that the coverage of the radio network is intrinsically linked to the loading of the system. The more traffic is carried by a cell, the smaller the coverage area of the cell becomes. Since traffic in a cell will change continuously, the coverage area of the cell will change continuously as well. This effect is known as cell breathing. The dynamic behaviour of the cell makes CDMA radio planning and evaluation complex.

According to another embodiment of the invention a solution is provided for radio planning and/or evaluation of CDMA radio networks that takes the complication of the cell breathing effect into account. This is done by calculating parameters such as link budget L, noise rise $\kappa$ and soft HO gain, taking the traffic into account for each pixel. The link budget can be defined for uplink (i.e. from the user terminal to the base station) as the power headroom for a user terminal in a pixel that remains after diverse effects such as maximum transmission power of the user terminal, propagation losses (path and penetration) and the receiver sensitivity of the base station have been taken into account. The link budget calculation involves, besides parameters known from GSM radio networks, some specific CDMA network parameters as well. A typical CDMA parameter that can be included in link budget calculations is soft HO gain. Soft HO gain can be described as the link budget enhancing effect when the signal from the user terminal is received in several cells, which may belong to several base stations. The noise rise $\kappa$ is another typical CDMA parameter. The noise rise can be defined as the ratio of the total received power by the base station and the thermal noise. It can be shown that, amongst others, noise rise depends on the number of users N in a cell and the type of service required by these users. Moreover interference from other cells might influence the noise rise in the cell under consideration.

CDMA radio planning and/or evaluation according to the invention relates to comparing the link budget for an unloaded system with the noise rise due to loading, i.e. the noise rise taking traffic into account.

It is noted that the embodiments and/or aspects can be combined.

C. SHORT DESCRIPTION OF THE DRAWINGS

Figure 3A:
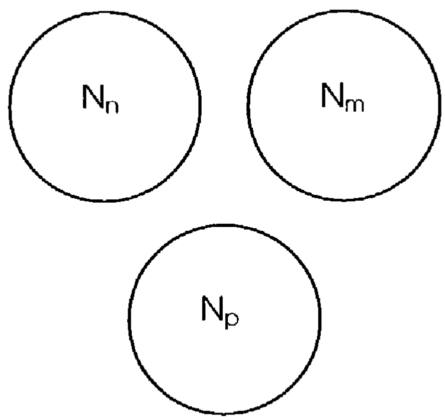
Figure 6:
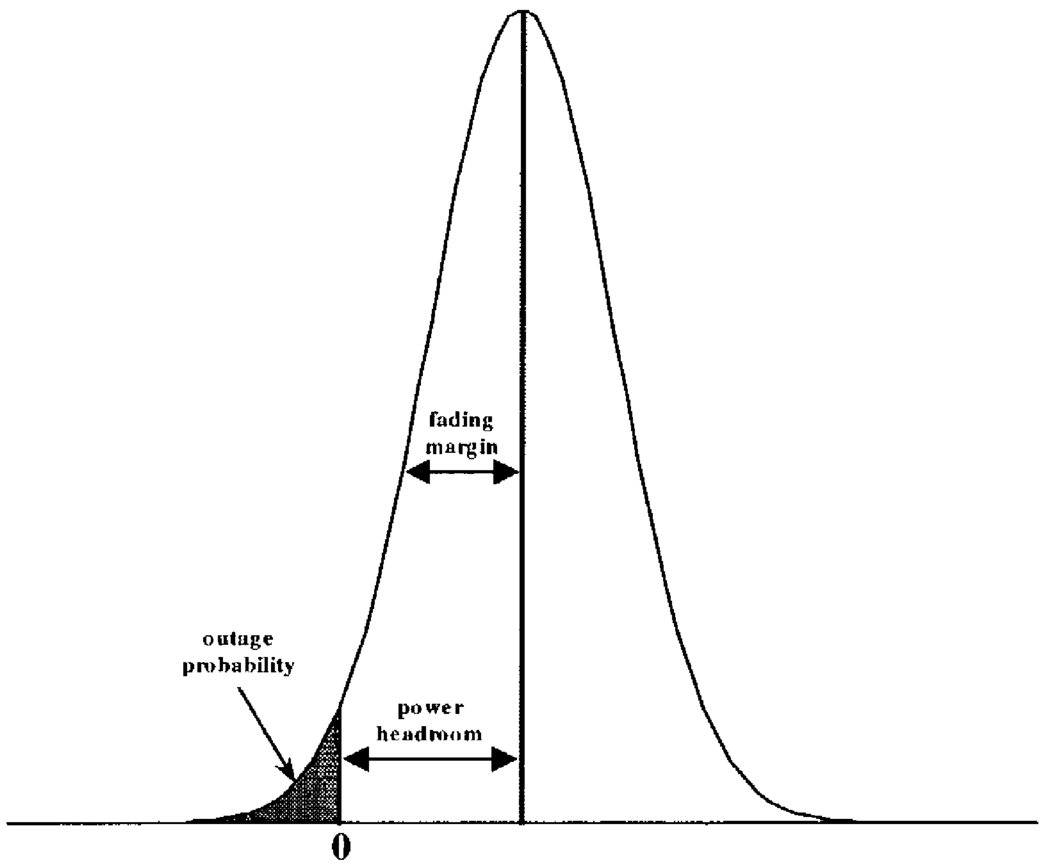
Figure 7:
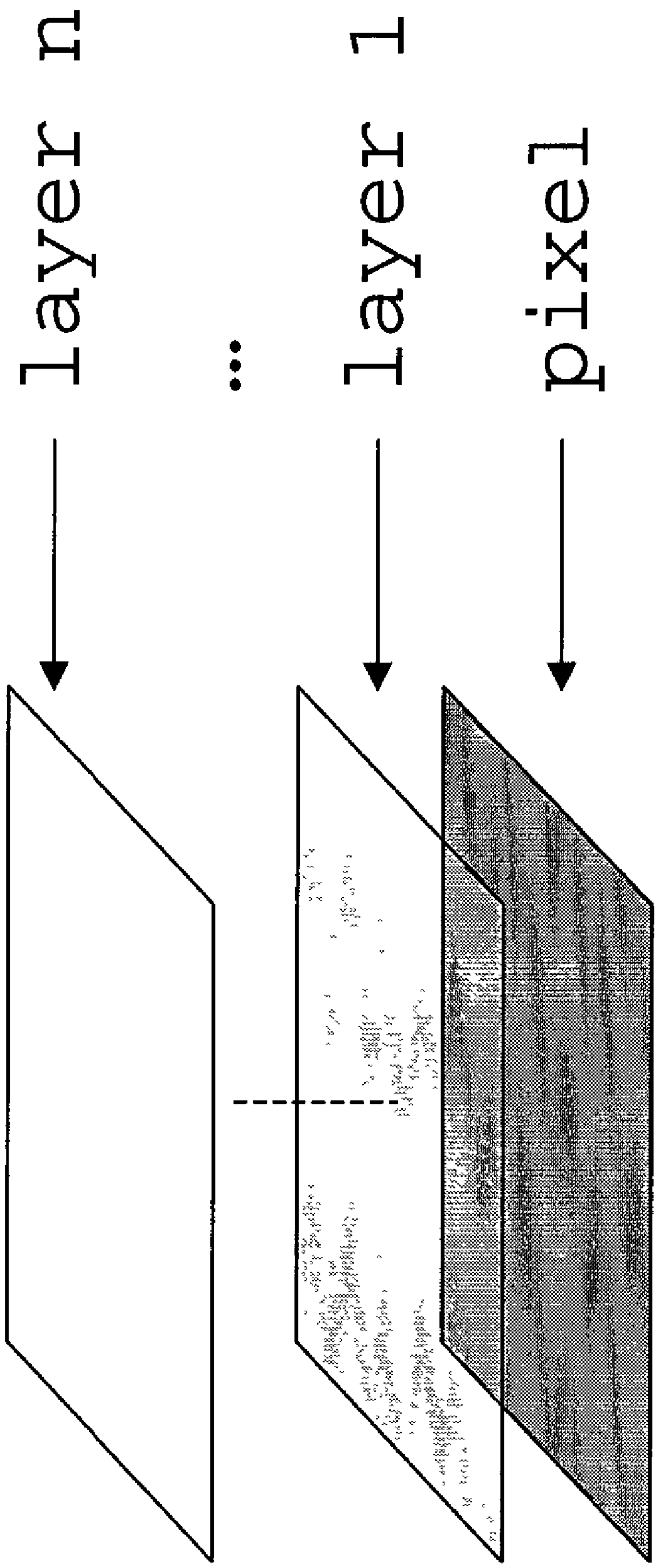

FIGS. 3A, B show schematic illustrations of non-overlapping cells and overlapping cells to account for soft HO effects according to an exemplary embodiment of the invention;

FIGS. 4A–E show the results for the cell coverage for a simplified radio network applying the algorithm to a first exemplary situation according to an exemplary embodiment of the invention;

FIGS. 5A–F show the results for the cell coverage for a simplified radio network applying the algorithm to a second exemplary situation according to an exemplary embodiment of the invention;

FIG. 6 shows the fading margin deviation as a normal distribution according to an exemplary embodiment of the invention;

FIG. 7 shows the concept of layers according to an exemplary embodiment of the invention.

D. DESCRIPTION

For the purpose of teaching the invention, preferred embodiments of the method and devices of the invention are described in the sequel. It will be apparent to the person skilled in the art that other alternative and equivalent embodiments of the invention can be conceived and reduced to practice without departing from the true spirit of the invention, the scope of the invention being only limited by the claims as finally granted.

Figure 1:
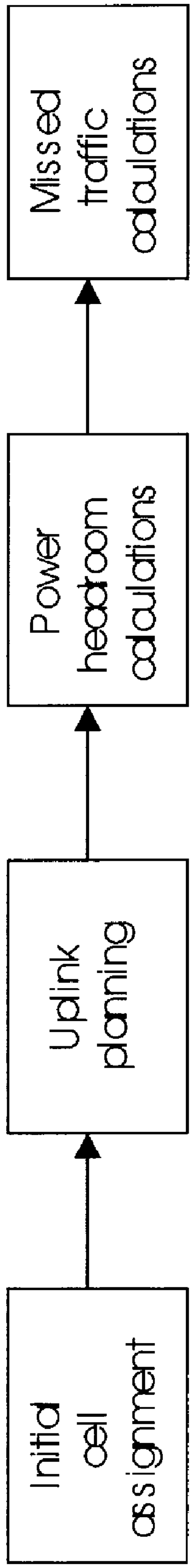
FIG. 1 shows the different stages of the planning and/or evaluation process for a radio network according to an exemplary embodiment of the invention.

The planning and/or evaluation method according to an embodiment of the invention can involve the following phases as shown schematically in FIG. 1. Each phase can involve one or more steps programmed in corresponding modules or subroutines. At first initial cell assignment is employed. Afterwards a base station position and a traffic grid are evaluated in terms of noise rise in a cell. Information is gained about which pixels are covered and the margin in the link budget for a user terminal in a given pixel. From these results the power headroom for every pixel in the radio network is calculated which can be translated into an outage probability for a given type of fading environment. Other information might be obtained, such as sensitivity to variations in traffic density. Finally a module can be provided to perform missed traffic calculations that might be used in the planning and/or evaluation activities with respect to the radio network. The steps of the method according to an embodiment of the invention will be discussed in more detail below.

Initial Cell Assignment and Uplink Planning

Figure 2:
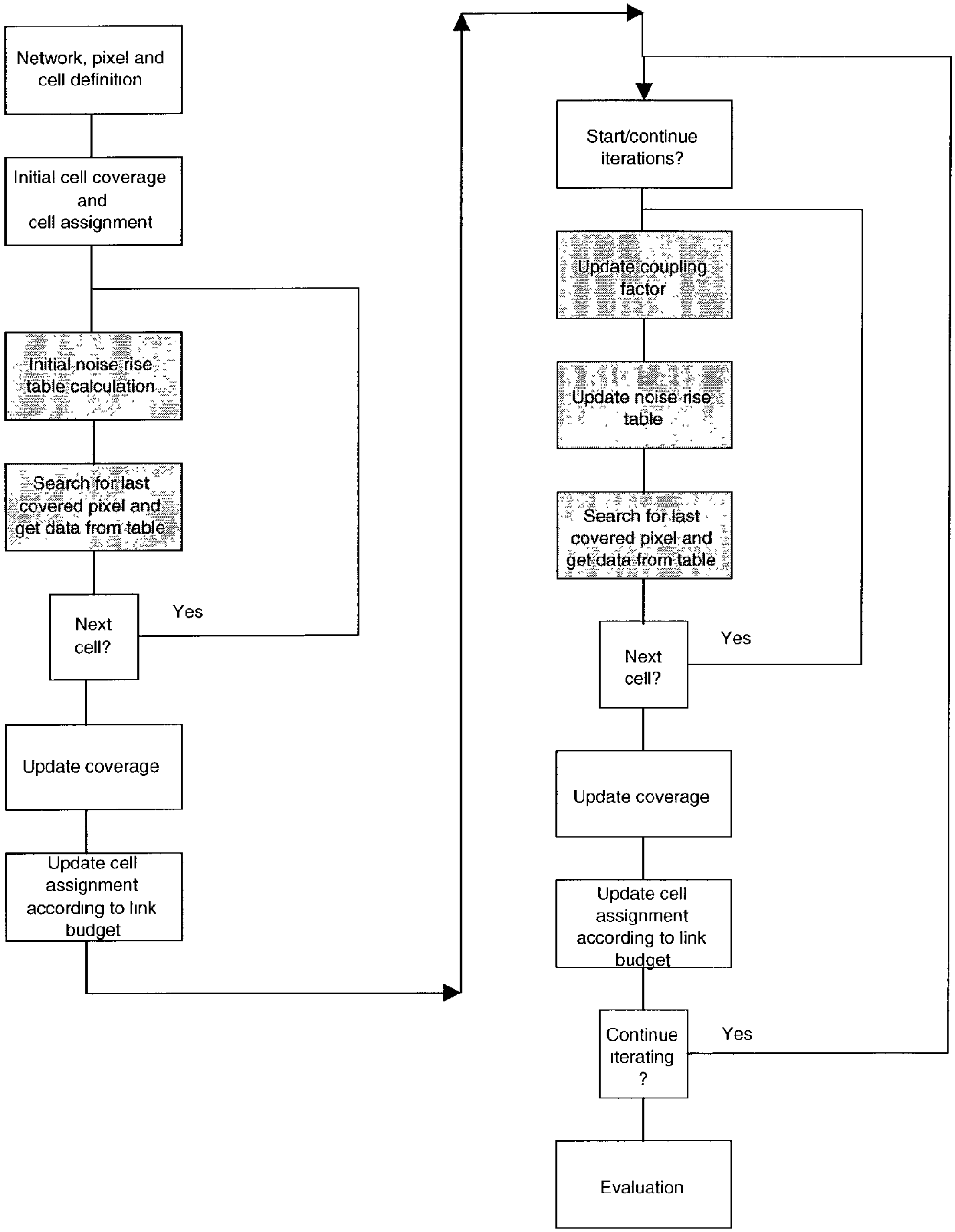
FIG. 2 shows a flowchart of the radio planning with noise rise according to an exemplary embodiment of the invention.

An example of the analysis to be performed in this phase is shown in FIG. 2. FIG. 2 considers the initial cell assignment and uplink planning steps as shown in FIG. 1 in more detail. The algorithm might consist of the following three steps.

1. Initial cell assignment—the coverage is calculated for an unloaded cell, i.e. no active user terminals are assumed to be present in the cell; coverage is only dependent on the link budget L in this step.

2. Initialisation—the coverage is calculated for loaded cells, without taking inter-cell interference into account. The purpose of this step is to obtain an initial state for the iterative calculations that might be performed in step 3. It should be noted however that the coverage taking inter-cell interference into account may already be calculated in this initialisation step, although this calculation is likely to be less accurate.
3. Iterations—the coverage is calculated for a loaded system, thereby taking inter-cell interference into account. Here the iterative part of the calculations is executed.

In FIG. 2 functions which are performed for the whole radio network are in white boxes and functions which are performed per cell are in shaded boxes.

It is possible to perform only the first and second step without executing the iterative process. In such a case it might be that in the initialisation step 2 inter-cell interference is taken into account. Such an estimate would be sufficient if e.g. a first indication of the degree of coverage and of problematic areas is needed. Alternative methods of altering the basic algorithm as described above can be part of an embodiment of the method and system according to the invention. The algorithm will yet be described in more detail.

Initial Cell Assignment—Coverage for Unloaded Cells

The purpose of this step, which needs preferably to be performed only once, is twofold. The cell assignment step can be used to give a first indication of the coverage of a cell. Moreover it can be used to reduce algorithm complexity by limiting the number of cells which are associated with a pixel.

Several methods can be used to perform the initial cell assignment. A first method to initially assign cells to pixels is to use the link budget L. For each pixel, the link budget to relevant base stations in the pixel is calculated. By putting constraints on the link budget for either the downlink pilot channel or the traffic channel (uplink or downlink or both), a coverage estimate is used to assign any number of cells to a given pixel. This gives, per pixel, a set C of possible cell candidates.

The link budget can be calculated in several ways. Noise rise and soft HO gain are preferably disregarded here. The coverage probability can e.g. be used as a constraint and therefore a fading margin is taken into account in calculating the link budget:

$$L_{budget,dB} = \text{Tx Power} - \text{Rx Sensitivity} - \text{Path Loss} - \text{Fading Margin}\begin{pmatrix}\text{coverage}\\ \text{constraint}\end{pmatrix} \quad (1)$$

To evaluate the coverage probability after the analysis, the link budget can be defined as $$L_{budget,dB} = Tx \text{ Power} - Rx \text{ Sensitivity} - \text{Path Loss} \quad (2)$$

Additional elements might be included in the link budget calculation as well, such as e.g. antenna gain.

A cell assignment as performed in the procedure above might still give too many cell candidates per pixel. A more realistic estimate of the cells that cover certain pixels can be obtained by comparing link budgets. It is then assumed that a user in a certain pixel will only make use of the strongest cell, or a cell which is only marginally weaker (or several cells in soft HO). To assign cells to pixels the following procedure can be used in this case:

1. from the subset C of cells that cover a pixel p, take the one which has the best link budget, $L_{budget,dB,best}$
2. define the maximum allowed link budget difference $L_{diff,dB,max}$
3. those other cells from the subset C which have a link budget $L_{budget,dB}$, such that $L_{budget,dB,best} - L_{budget,dB} \leq L_{diff,dB,max}$ are assigned to the pixel, all other cells are not. The result is a reduced subset $C_{reduced}$ of cells.

If $L_{diff,dB,max}$ is chosen to be the same value as the soft HO threshold, this method of initial cell assignment should quite accurately indicate the cells with which connections will be made from a certain pixel of the service area.

It is also possible to make an initial cell assignment based on other criteria than those above. Preferably all cells which (with reasonably high probability) could be used in a certain pixel are taken into account. However, to keep the complexity of the algorithm low, any other cells should not be assigned to a pixel.

Initialisation—Coverage for Loaded Cells

The link budget can be calculated in several ways. Noise rise and soft HO gain are preferably disregarded here. The coverage probability can e.g. be used as a constraint and therefore a fading margin is taken into account in calculating the link budget:

In this step the initial state for the possible iterations is obtained. Basically most non-zero or non-infinite values can be used as a starting point, but to make the algorithm converge within a reasonable period of time preferably values can be used that are already close to the final values. Two initialisation examples will be presented. In a first example the coverage is calculated for loaded cells, without taking inter-cell interference into account. For each cell, a so-called noise rise table is calculated (see table 1). This table consists of five columns and preferably takes all pixels (the respective rows in the table) into account, to which the cell of interest has been assigned. The first column refers to the pixel number, making it possible to refer to data stored for the pixel. The second column contains the link budget (see equations (1) or (2))—the entire table is preferably sorted according to this column, starting with the pixel with the best link budget. The next column contains the number of users in the pixel (denoted by $N_{n,p}$ in pixel p of cell n). The fourth column comprises the accumulated number of users in this pixel and all other pixels which precede it, i.e. pixels having a better link budget L than the pixel under consideration if the pixels have been sorted on the basis of the link budget value. The last column represents the noise rise calculated from the accumulated number of users. The formula for calculating the noise rise for a single isolated cell is $$\kappa_n(N_n) = \frac{1}{1 - \frac{N_n}{N_{\max}}} \quad (3)$$

where $N_{max}$ is the pole capacity that depends on the type of service provided. Alternative expressions for the noise rise can be used as well. It should be noted that the number of users N preferably refers to the equivalent number of continuously active users of a reference service. Suppose that 1000 potential users with a user terminal are present in a pixel and the probability of using this terminal is 1%. For CDMA radio networks also the effective activity is relevant, suppose for a speech terminal this to be 60%. The equivalent number of users in this pixel yields 6 for this situation. Users of other services, e.g. data services, can be treated in a similar way. Moreover, for CDMA radio networks the received power relative to interference, and consequently also the transmission of the user terminal is relevant. Some kind of services can be very sensitive to transmission errors and therefore higher user terminal transmission powers should be used. A user of such a device contributes more heavily to the equivalent number of users N than users with terminals requiring services with lower error sensitivity, i.e. lower transmission power, even if the activity is the same.

Noise rise table 1.

| Pixel index | $L_{budget}$ | Number of users | $N_n$ | κ |
|---|---|---|---|---|
| a | <best link budget> | $N_{n,a}$ | $N_{n,a}$ | $\kappa(N_{n,a})$ |
| b | <second best link budget> | $N_{n,b}$ | $N_{n,a} + N_{n,b}$ | $\kappa(N_{n,a} + N_{n,b})$ |
| | . . . | . . . | | |
| c | <worst link budget> | $N_{n,c}$ | $N_{n,a} + N_{n,b} + \ldots + N_{n,c}$ | $\kappa(N_{n,a} + N_{n,b} + \ldots + N_{n,c})$ |

If the link budget is very critical, i.e. if the coverage probability of this link is low, it is possible that only a fraction of the users in a pixel will be able to establish a connection. This effect can be taken into account by applying a weight factor to the number of users in the third column of the noise rise table 1. E.g. this weight factor can be $W_{n,a}=1-P_{outage,n,a}$ with $P_{outage,n,a}$ the probability of outage in a pixel a of cell n. The introduction of a weight factor can especially be useful if the link budget does not take a fading margin into account. If the link budget does take a fading margin into account it can be assumed that all users are able to establish a connection as long as the link budget is adequate.

The coverage of a single loaded cell can be found by searching from the top in the noise rise table for the last row which satisfies the coverage condition $$\kappa \leqq L_{budget} \tag{4}$$

Alternatively the coverage condition can be based on a predetermined minimum allowable $L_{budget}$–κ ratio ρ (formula 4b) or a predetermined minimum allowable difference δ between $L_{budget}$–κ (formula 4c)

$$\frac{L_{budget}}{\kappa} \geq \rho \tag{4b}$$

$$L_{budget} - \kappa \geqq \delta \tag{4c}$$

As a result the covered and non-covered pixels by the cell, and how many users the cell covers are known. Optionally a maximum allowed noise rise for a cell can be defined and used as an extra criterion to limit the noise rise and the number of users $$\kappa \leqq \kappa_{allowed}. \tag{5}$$

Another initialisation example will be discussed next. The first example as discussed above excluded inter-cell interference in the calculation of the noise rise for the initial noise rise table. In other words, it was assumed that no other cells were present or at least no interference occurred. For a multi-cell environment effects of inter-cell interference should preferably be taken into account. A reasonable coverage approximation accounting for inter-cell interference can already be obtained in the initialisation step. To include the effect of inter-cell interference some estimate of the number of users in other cells is assumed to be available. An initial estimate can be made from the best server area (BSA). The best server area of a certain cell is defined as the set of pixels for which this cell provides the best link budget. If $N_{m,BSA}$ is the number of users in the BSA of cell m, the noise rise estimate for inter-cell interference is $$\kappa_n(N_n) = \frac{1}{1 - \frac{N_n + \sum_{m \neq n} \beta_{mn} N_{m,BSA}}{N_{max}}} \tag{6}$$

with $\beta_{mn}$ a coupling factor. The coupling factor describes the effect of the interference caused by users in cell m on cell n and can take the distribution of the other users, the propagation conditions, the power level and the sensitivity of cell n to this interference into account. The product $\beta_{mn}N_m$ corresponds to the equivalent number of users in cell n. It is generally advantageous to first calculate a nominal (traffic independent, i.e. does not directly depend on the cell load) coupling factor $\beta'_{mn}$, and adjust this nominal coupling factor to account for the effects of the noise rise in the interfering cell (and thus the transmission power of the users in this cell), and the sensitivity of the interfered cell to the interference from other cells. The nominal coupling factor is preferably traffic independent in the sense that for a given cell size it does not depend on the actual number of users in the cell or their power levels, only on the geographical distribution of the users. The actual coupling factor is related to the nominal coupling factor as $$\beta_{m,n} = \kappa_m / \kappa_n * \beta'_{m,n} \tag{7}$$

In this way the nominal coupling factor can be calculated in advance and tabulated as a function of cell size.

Because of the relation between the number of users $N_n$ and the noise rise $\kappa_n$, it is also possible to write the noise rise in the form $$\kappa_n = f(\kappa_1, \kappa_2, \ldots, \kappa_{n-1}, \kappa_{n+1}, \ldots \kappa_M, B), \tag{8}$$

where B is the matrix of coupling factors. Since this equation is valid for all cells, a system of n equations with n unknown variables is available.

Iterations—Coverage for Loaded System

The third step of the algorithm comprises the iterative procedure. The iteration can comprise a few steps, some of which can be equivalent to the steps taken to calculate the initial noise rise table 1.

In a first example it is assumed that cells in the radio network do not overlap, i.e. no more than one cell is assigned to a pixel, and consequently a users terminal may have connection to only one cell at a time.

In each iteration and for each cell, the noise rise column in the noise rise table for cell n is updated using results from the previous situation according to $$\kappa_n^{(i)} = \frac{1}{1 - \frac{N_n + \sum_{m \neq n} \beta_{mn} N_m}{N_{max}}}, \tag{9}$$

where $$N_m = \begin{cases} N_m^{(i-1)} & \text{if } N_m \text{ has not been updated in iteration } i \\ N_m^{(i)} & \text{if } N_m \text{ has been updated in iteration } i \end{cases}, \tag{10}$$

and $$\beta_m = \begin{cases} \beta_m^{(i-1)} & \text{if } \beta_m \text{ has not been updated in iteration } i \\ \beta_m^{(i)} & \text{if } \beta_m \text{ has been updated in iteration } i \end{cases}. \tag{11}$$

For a particular row, i.e. pixel of the service area, the value of $N_n$ is taken from the fourth column of the same row in the noise rise table. Note that the coupling factor can be variable, requiring an update in every iteration as well. Many possible ways to reduce the computational complexity can be imagined. For example, pixels can be grouped into clusters, reducing the number of rows in the table, or—because only the last row which satisfies the coverage condition $\kappa \leqq L_{budget}$ and the maximum allowed noise rise condition $\kappa \leqq \kappa_{allowed}$ needs to be found—a searching procedure can be imagined which does not require every row to be evaluated.

When all noise rise tables have been updated, the new coverage area can be obtained from the noise rise table by looking for the last row which satisfies the coverage condition and the maximum allowed noise rise condition. This gives the final values for $\kappa_n^{(i)}$ and $N_n^{(i)}$, which can be used in the next iteration. If no maximum allowed noise rise is used as a criterion, or if this is too high for a highly loaded cell, it might be that the interference from this cell is so high that other cells will have no coverage at all. Therefore, the maximum allowed noise rise should be chosen carefully for each cell.

The assignment of cells to a pixel might need to be updated during the iterative process. E.g., if two cells A and B were originally assigned to a pixel, it could happen that only cell A can be used if cell B is heavily loaded and therefore has less coverage. Such an update must preferably also be reflected by an update of the corresponding link budget and an update (re-sort) of the noise rise tables.

It should be noted that the cell assignment can be made according to any criteria, not only coverage. For example, one could model the actual sector selection and call control procedures instead.

For implementation purposes, it is convenient to define two sets of cells per pixel. One for the coverage in an unloaded system, containing all cells which can have a connection (set C or $C_{reduced}$ as defined above), and another defining the cells which have coverage in the loaded system (i.e. reflecting the state after each new iteration). The set for a loaded system does not contain cells not included in the set for the unloaded system.

The iteration can e.g. be stopped when the noise rise change from one iteration to another is smaller than a given number, or when there are only very small changes in coverage.

Soft Handover Effects

In the analysis above soft HO effects have been disregarded. The link budget is modified when soft HO effects are taken into account.

$$\begin{aligned} L_{budget,soft\ HO,dB} &= L_{budget,dB} + \text{Soft HO Gain} \\ &= \text{Tx Power} - \text{Rx Sensitivity} - \\ &\quad \text{Fading Margin} - \text{Path Loss} + \\ &\quad \text{Soft HO Gain} \end{aligned} \tag{12}$$

The soft HO gain is a function of relative differences in received signal strength in the base station. However, the signal strength received by a particular base station must be compared with the noise rise experienced in the corresponding cell. Therefore the soft HO gain is a function of both link budget differences and cell load, and is no longer dependent on the pixel position only.

When the cell load changes, not only the received signal level above noise rise level changes, but the cell border changes as well. Depending on how the cell assignment is modelled, a pixel which was in soft HO in a lightly loaded system, might have connection with only one base station when the load increases.

Changes of cell assignments and noise rise result in changes in the soft HO gain and therefore also in the link budget. This must be reflected by changes in the noise rise table as well.

The soft HO gain is preferably also taken into account in the noise rise calculation. This can be done by giving users in soft HO a lower weight, as will be discussed below.

In modelling the soft HO gain many factors can be taken into account to obtain accurate results. However, while the proposed method allows to account for soft HO effects, an accurate result might only be useful if other parts of the planning process also provide accurate results.

Depending on e.g. the degree of accuracy required, soft HO gain can be modelled in several ways. A very simple way is to use an average soft HO gain for all users which according to the cell assignment criteria are in soft HO. This gain can be used both in the link budget calculation and in the noise rise calculation.

More sophisticated modelling of the soft HO gain can be based on the link budget differences as used for the cell assignment. E.g., the soft HO gain can be calculated as a function of the difference in link budgets (not including soft HO gain or noise rise) to the two strongest cells. If $L_{budget,dB,best}$ is the best link budget, and $L_{budget,dB,2nd\ best}$ is the second best, then the soft HO gain could be calculated as $$\text{Soft HO Gain} = \text{Max Gain} \times \left(1 - \frac{L_{budget,dB,best} - L_{budget,dB,2nd\ best}}{L_{diff,dB,\max}}\right) \tag{13}$$

where $L_{diff,dB,max}$ is defined as previously and Max gain is a parameter obtained e.g. from measurements. To avoid having to make a distinction between pixels with connections to one cell and those with connections to several cells, it is convenient to give pixels which have only one cell assigned a soft HO gain of 0 dB.

By taking soft HO gain into account, the link budget for the noise rise table changes. But, because users in soft HO transmit with lower average power, these users must be modelled as lower equivalent numbers of users. Such a modification is preferably incorporated in the noise rise table. With $G_{softHO,p}$ calculated as $$G_{soft\ HO,p} = 10^{Soft\ HOGain(p)} \tag{14}$$

where Soft HO Gain(p) is the soft HO gain in pixel p, the new noise rise table, which takes the reduced transmission power during soft HO into account, is:

The noise rise can be written as $$\kappa_n = \frac{1}{1 - \frac{N_{total}}{N_{\max}}}, \tag{18}$$

where for the three non-overlapping cells $N_{total}=N_n+\beta_{mn}N_m+\beta_{pn}N_p$, the correct formula for overlapping cells is $$N_{total} = N_n - \frac{1}{2}(N_{nm} + N_{np}) - \frac{2}{3}N_{nmp} + \beta_{mn}\left[N_m - \frac{1}{2}(N_{nm} + N_{mp}) - \frac{2}{3}N_{nmp}\right] + \beta_{pn}\left[N_p - \frac{1}{2}(N_{np} + N_{mp}) - \frac{2}{3}N_{nmp}\right] \tag{19}$$

This formula could be written in other, equivalent ways as well, but this form (or similar ones) is convenient because the number of users $N_n$ can be taken directly from the column of accumulated users in the noise rise table of cell The new noise rise table 2, including soft HO effects.

| Pixel index | $L_{budget,softHO}$ | Equivalent Number of users | $N_n$ | $\kappa$ |
|---|---|---|---|---|
| A | <best link budget> | $N_{n,a}$ / $G_{softHO,a}$ | $N_{n,a}$ / $G_{softHO,a}$ | $\kappa$( $N_{n,a}$ / $G_{softHO,a}$) |
| b | <second best link budget> | $N_{n,b}$ / $G_{softHO,b}$ | $N_{n,a}$ / $G_{softHO,a}$ + $N_{n,b}$ / $G_{softHO,b}$ | $\kappa$( $N_{n,a}$ / $G_{softHO,a}$ + $N_{n,b}$ / $G_{softHO,b}$) |
| | . . . | . . . | | |
| c | <worst link budget> | $N_{n,c}$ / $G_{softHO,c}$ | $N_{n,a}$ / $G_{softHO,a}$ + $N_{n,b}$ / $G_{softHO,b}$ + . . . + $N_{n,c}$ / $G_{softHO,c}$ | $\kappa$( $N_{n,a}$ / $G_{softHO,a}$ + $N_{n,b}$ / $G_{softHO,b}$ + . . . + $N_{n,c}$ / $G_{softHO,c}$) |

As noted above, in reality the link budget will change when traffic enters the systems, and consequently the soft HO gain will change as well. In this simplified model of soft HO effects, it can be sufficient to update the cell assignment and the soft HO gain (resulting in a re-sort of the noise rise table) when the coverage status of a pixel changes, i.e. when the number of cells which cover a pixel changes because of cell breathing effects.

Figure 3B:
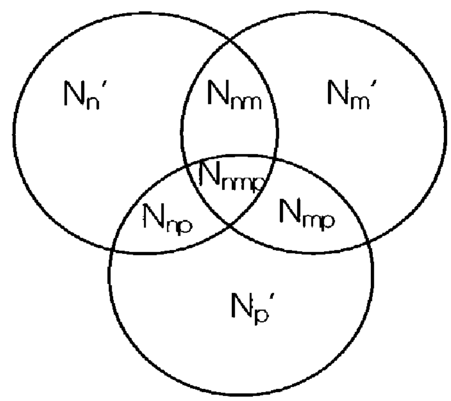

When cells overlap, the noise rise is modified such that the users in soft HO, which belong to two or more cells, only contribute once to the total interference. Firstly, the users are distinguished in areas of no hand-over, soft HO with one cell, soft HO with two cells, and so on; see FIG. 3 for an example. Now, for the example of overlapping cells in FIG. 3, the total number of users in cell $N_n$ is $$N_n = N'_n + N_{nm} + N_{np} + N_{nmp}, \tag{15}$$

Similarly, the users in the other cells are $$N_m = N'_m + N_{nm} + N_{mp} + N_{nmp} \tag{16}$$

$$N_p = N'_p + N_{np} + N_{mp} + N_{nmp} \tag{17}$$

n (which is evaluated), and all other numbers are results from previous calculations, compare equations (9) to (11).

Thus, for every cell which interferes (including the cell for which the noise rise should be calculated) the number of users is adjusted such that users in soft HO with x cells are only accounted for with a factor 1/x. This formula can be extended to include any number of cells. It should be pointed out that in addition to the correction of the number of interfering users, a correction in a similar manner must also be made when calculating the coupling factor.

The System

The radio planning and evaluation process as described is preferably implemented by means of modules or routines and submodules. Parameters to be used can be grouped into general network parameters, parameters and vectors describing a pixel and pixel structure, parameters describing a cell structure and parameters describing a table. A main module can be used for the actual planning and/or evaluation process. This main module can take information about the network, the traffic grid, link budgets etc. as input and calculates the resulting noise rise in each cell. In addition information can be obtained about which pixels are covered and the link budget margin in each pixel. The main module can call several submodules some of them will be described below.

A network definition submodule defines the parameters which are valid for the entire radio network; these parameters can be retrieved from a database. A pixel definition submodule takes data from a database and puts them in a pixel structure. A cell-definition submodule takes data from databases and puts them in the cell structure. This structure preferably only contains data relevant for the noise rise planning module. Moreover modules are provided to initially assign cells to pixels based on e.g. coverage or link budget differences.

A module can be provided to update the coverage information, which can change from one iteration to another as a result of cell breathing. The coverage information can be taken from the noise rise table and the coverage search. The coverage information can be used for several purposes, amongst which there are estimations of soft HO areas calculation and plotting. If soft HO gain is not accounted for, it can be sufficient to update the cell coverage information before plotting.

A module can be provided to build the initial noise rise table. Besides the traffic in the cell of interest it can also take an initial estimate of the traffic in other cells into account (e.g. based on the number of users in the BSAs).

Modules can be provided to calculate the coupling factor $\beta$ and the noise rise $\kappa$ as parameters and the equivalent number of users from other cells. The fact that users from other cells may be in soft HO can be taken into account in this module.

Modules can be provided to calculate the link budget and the soft HO gain. The former module can calculate the link budget between a given cell and pixel as a function of the maximum transmit power of the user terminal Tx, the receiver sensitivity Rx, and the path loss. The fading margin, antenna gain and soft HO gain can be taken into account as well. Soft HO gain can be taken into account e.g. by estimating an average soft HO gain for all users that according to the cell assignment criteria are in soft HO or based on the link budget differences as used for the cell assignment.

Modules can be provided for performing diverse kinds of table manipulations and for extracting information from the tables. Examples of these kind of modules include a module to sort based on e.g. the link budget column in decreasing order. The other columns, except for the pixel index and the number of users per pixel, are not necessarily sorted as well, since they will be recalculated before the table is evaluated. Another example of these modules includes a module to search the table for the last row (i.e. pixel of the cell under consideration) where the noise rise is less than the link budget or the allowed noise rise.

Modules can be provided to evaluate stopping criteria for the iteration.

EXAMPLES

To show how the algorithm performs two examples will be presented.

Figure 4A:
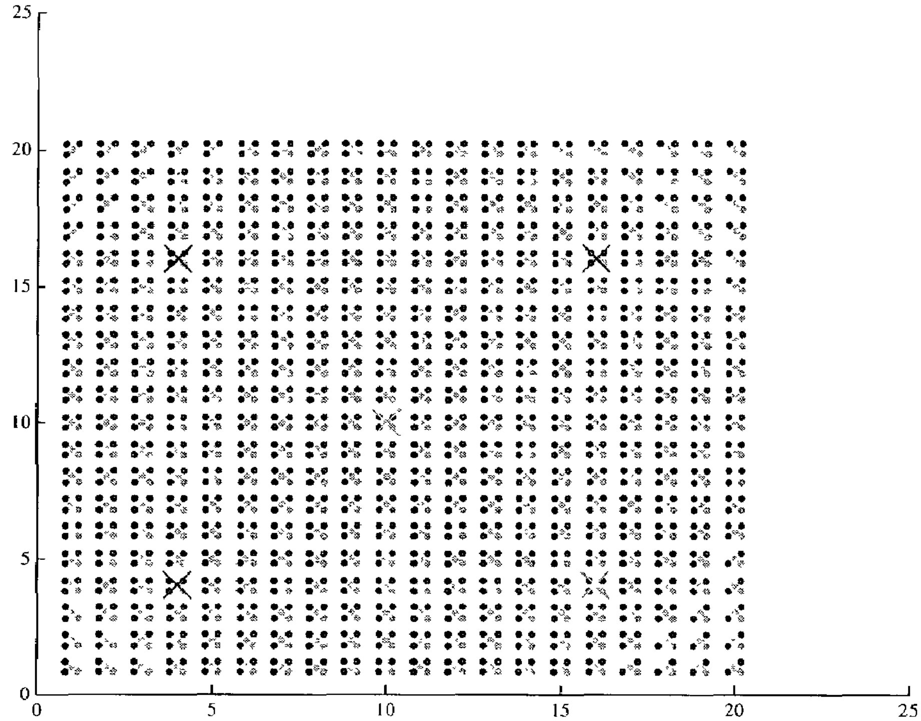
Figure 4B:
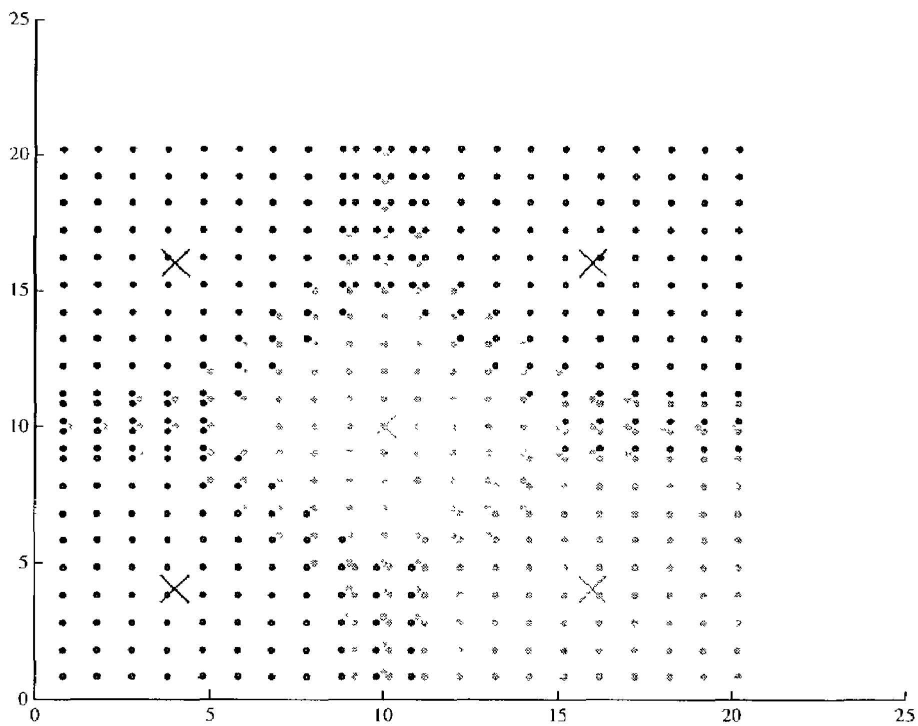
Figure 4C:
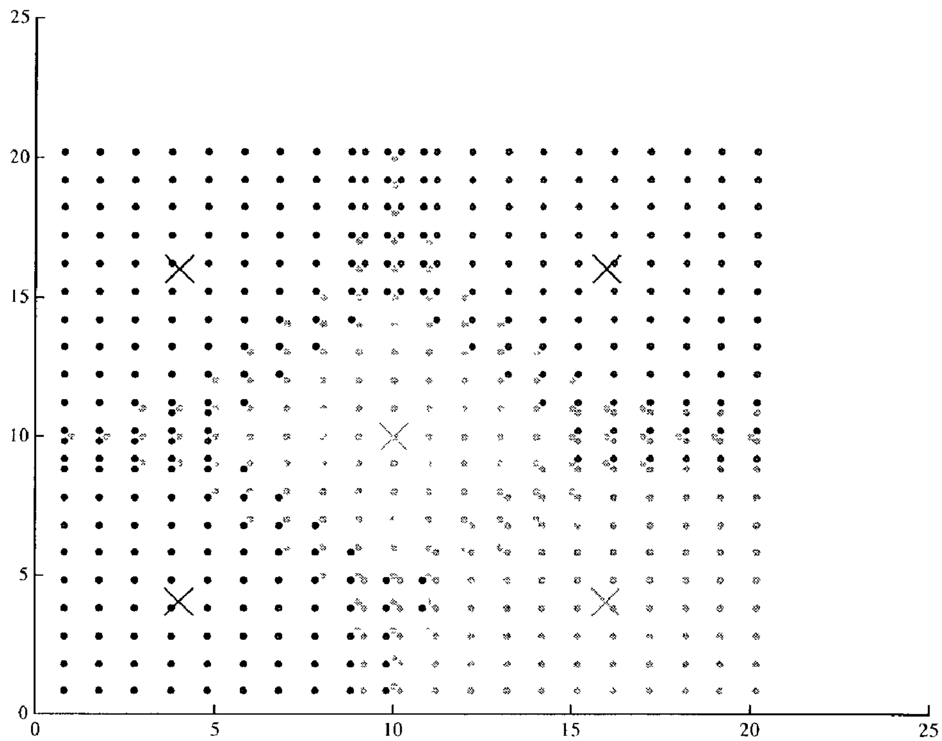
Figure 4D:
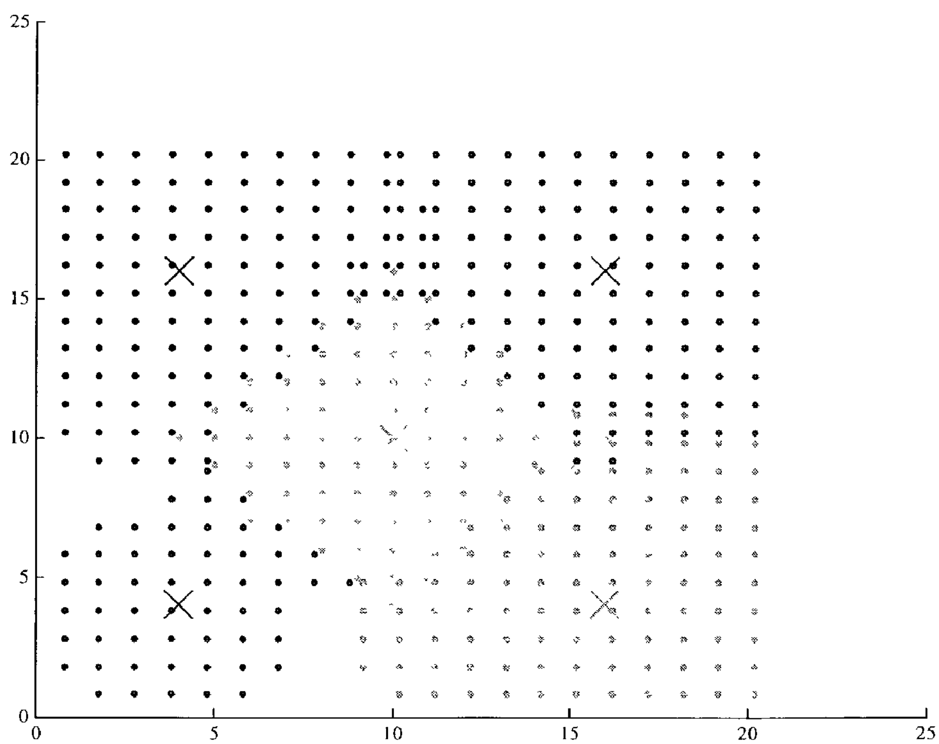
Figure 4E:
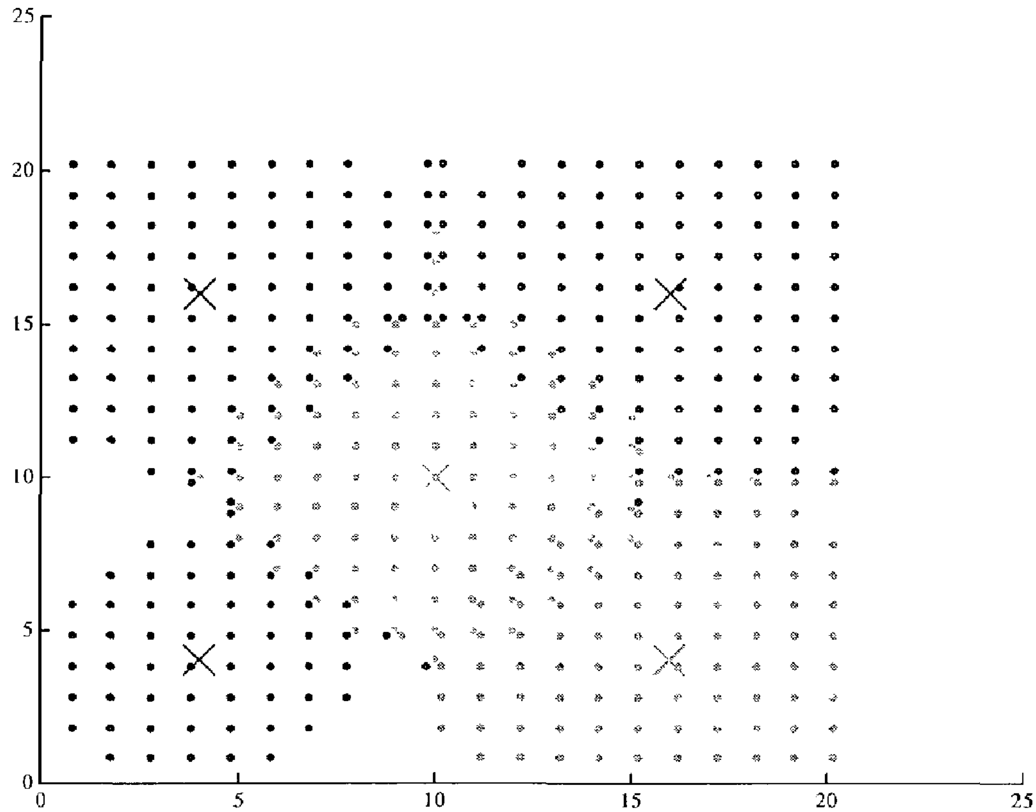

In an area consisting of 20*20 pixels, five cells are defined. There is one cell with a centre close to each corner, and one in the middle of the grid. FIG. 4A shows the coverage of these cells, given a certain link budget threshold. In FIG. 4B the number of cells per pixel are reduced by performing a cell assignment according to link budget differences. Then traffic is added to the system with 0.5 users per pixel (which means that the system is quite heavily loaded), plus a hot-spot at co-ordinate (2,2) with 30 users. The pole capacity is assumed to be 81 users. The initial noise rise table gives the result in FIG. 4C. Here, no inter-cell interference has been taken into account. A restriction is put on the cell size by choosing a maximum allowed noise rise of 9 dB for all cells. Soft HO effects are taken into account as described previously. If inter-cell interference is taken into account the result in FIG. 4D is obtained. The cell covering the hot-spot shrinks dramatically, whereas other cells still overlap to some degree. To get a more exact analysis of the inter-cell interference effects, iterations are performed. After a few iterations (in this example five iterations have been performed) the algorithm has converged and the result is as shown in FIG. 4E. The result is very similar to that in FIG. 4D.

Numerical results after the iterations are summarised in table 3.

TABLE 3

Numerical results obtained after iterations.

| Cell number | Position | Noise rise [dB] | Number of users in cell |
|---|---|---|---|
| 1 | Lower left | 9.0 | 58.5 |
| 2 | Upper left | 6.9 | 47 |
| 3 | Lower right | 6.9 | 47.5 |
| 4 | Upper right | 7.3 | 53 |
| 5 | Middle | 7.9 | 52.5 |

In a second example a structure of seven omni-directional cells is considered, arranged such that the cell in the middle is surrounded by a ring of six other cells. The pixels are 150 m×150 m. Initially three load situations are evaluated:

a) 0.05 users per pixel, b) 0.10 users per pixel, c) 0.15 users per pixel.

Especially the load situation b) and c) refer to a rather high cell load. By evaluating such high loads cell breathing effects can be clearly demonstrated. The parameters used in this simulation are summarized in table 4. Note that the soft HO gain and threshold is somewhat larger than one would expect in reality. The values are chosen to be able to clearly demonstrate the effects of soft HO.

TABLE 1

Parameters used for Example 2.

| Paramater | Value |
|---|---|
| Pixel size | 150 m × 150 m |
| UE max Tx power | 21 dBm |
| Node-B thermal noise density | −174 dBm / Hz |
| Node-B noise figure | 5 dB |
| Required Eb/NO in UL | 7.3 dB |
| Information data rate | 12200 bps |
| Node-B Rx sensitivity | −120.9 dBm |
| Soft HO threshold | 6 dB |
| Soft HO gain | between 0 and 6 dB, linearly dependent on link margin difference |
| Propagation model | Okumura-Hata |
| Node-B antenna gain | 13 dB |
| UE antenna gain | 0 dB |

Figure 5A:
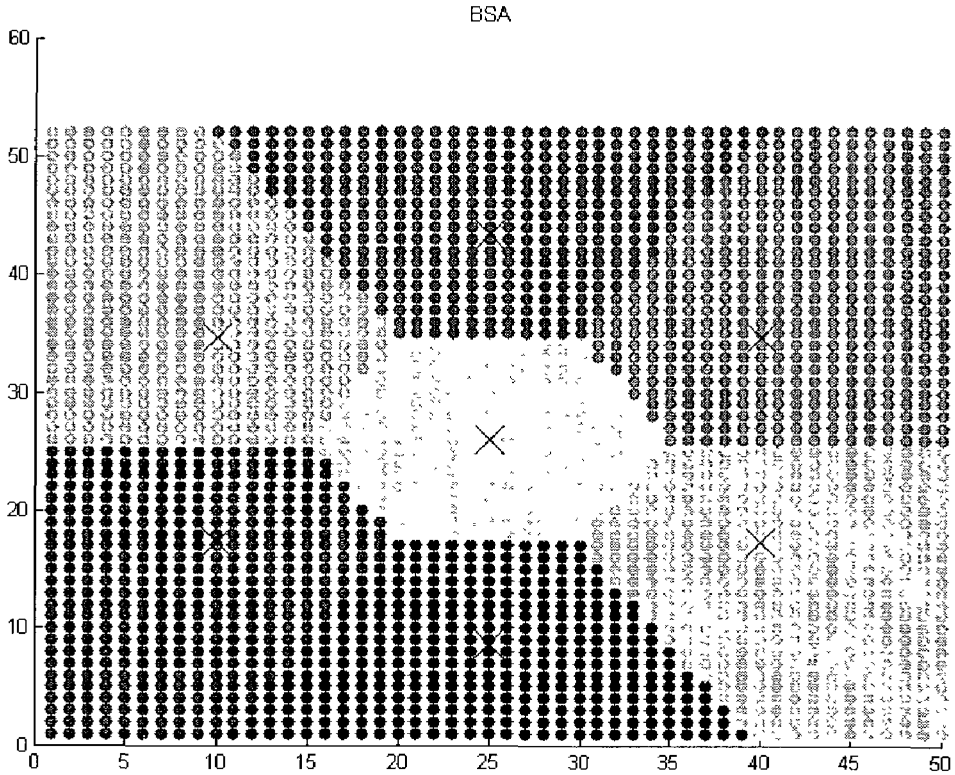
Figure 5B:
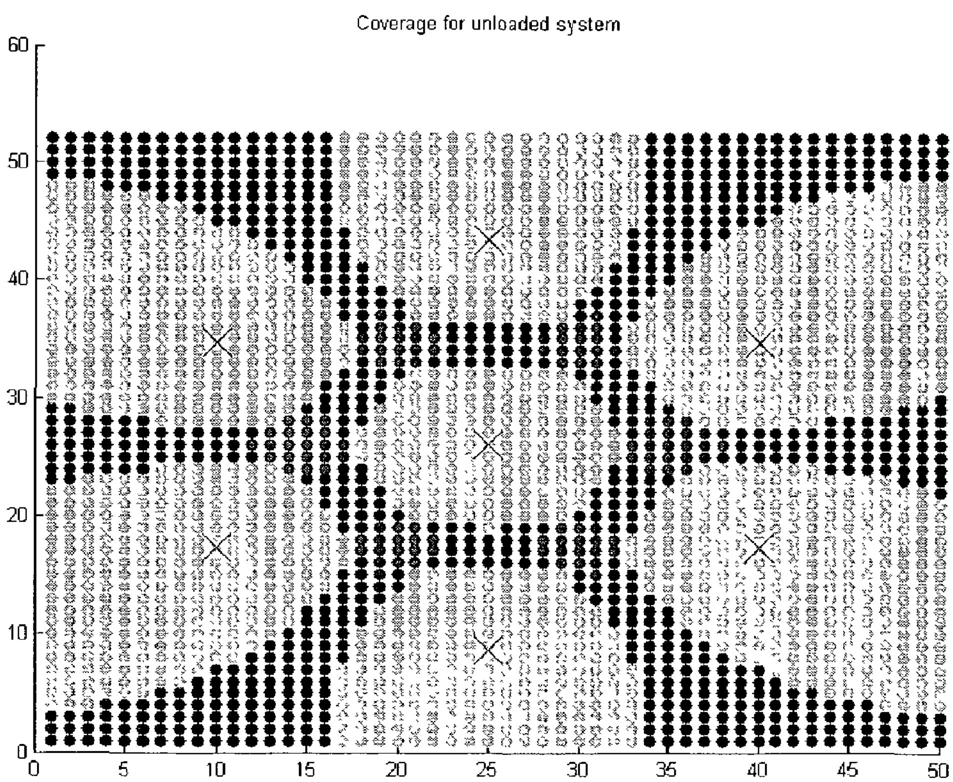

FIG. 5A shows the best server areas (BSAs) of the cells indicated by their different grey scales. In FIG. 5B the number of connections in the UL which can be used in each pixel is demonstrated by different grey scales. The assignment depends on the soft HO thresholds.

Figure 5C:
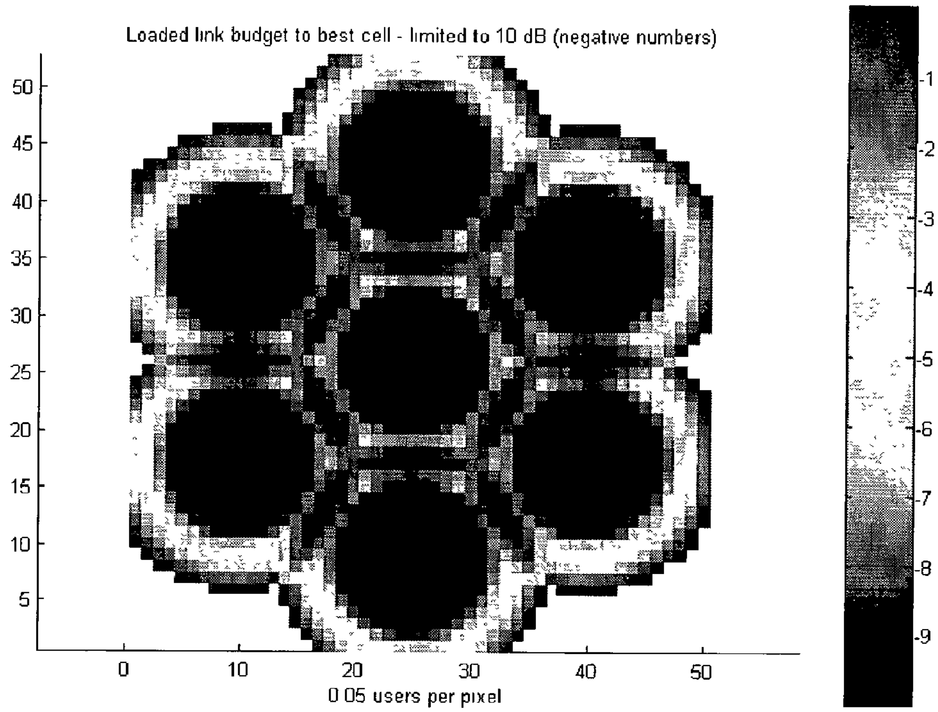
Figure 5D:
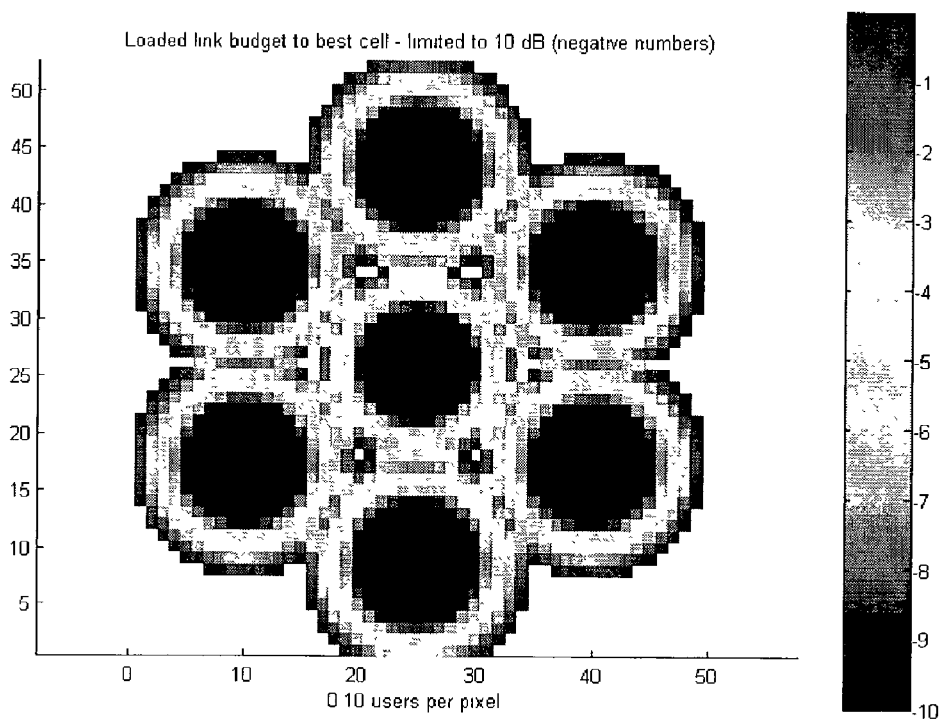
Figure 5E:
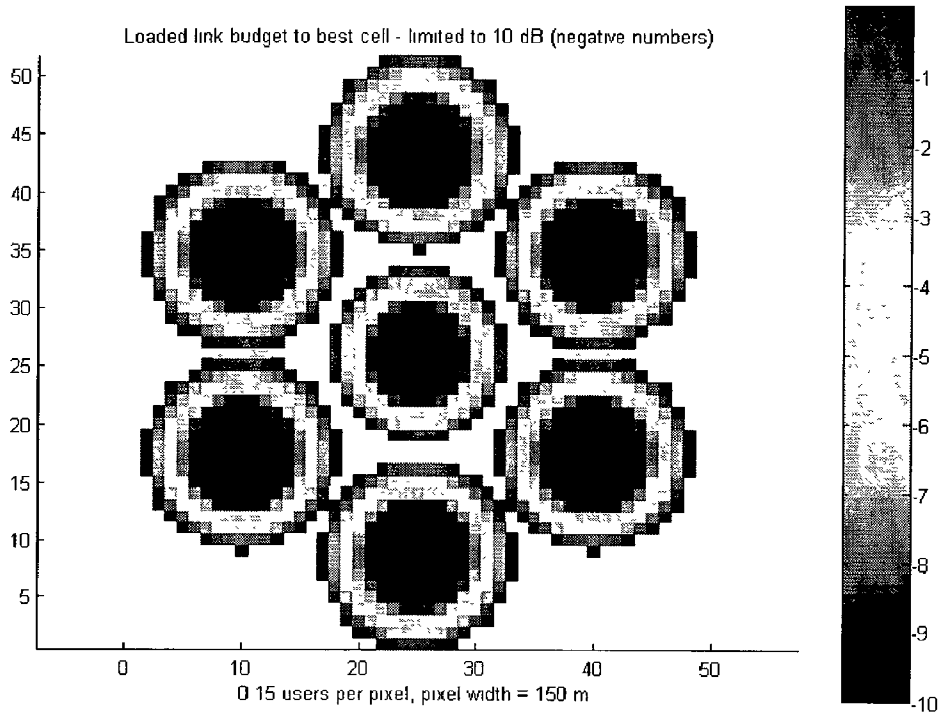

In the FIGS. 5C, 5D and 5E the link budgets for each pixel is shown in case of different traffic densities. Note that the numbers have been inverted for plotting purposes, such that red means a critical link budget (close to zero dB), and that blue means an uncritical link budget (about 10 dB or higher). A white area means that the pixel is not covered. From this data it is also possible to calculate the required UE transmission power.

For the lowest load (FIG. 5C) with 0.05 users per pixel a complete coverage of the area within the circle of cells is obtained. The effect of soft HO is clearly visible since the link budget is better exactly in the middle between two cells than somewhat closer to the centre of one cell. When the load increases, the coverage area decreases, see FIGS. 5D and 5E. To cover the whole area in a high-load situation one may

- split the omni-directional cells into smaller ones, using sectorized base stations,
- add another carrier, thereby distributing the traffic on two frequency bands
- move the base stations closer to each other.

Figure 5F:
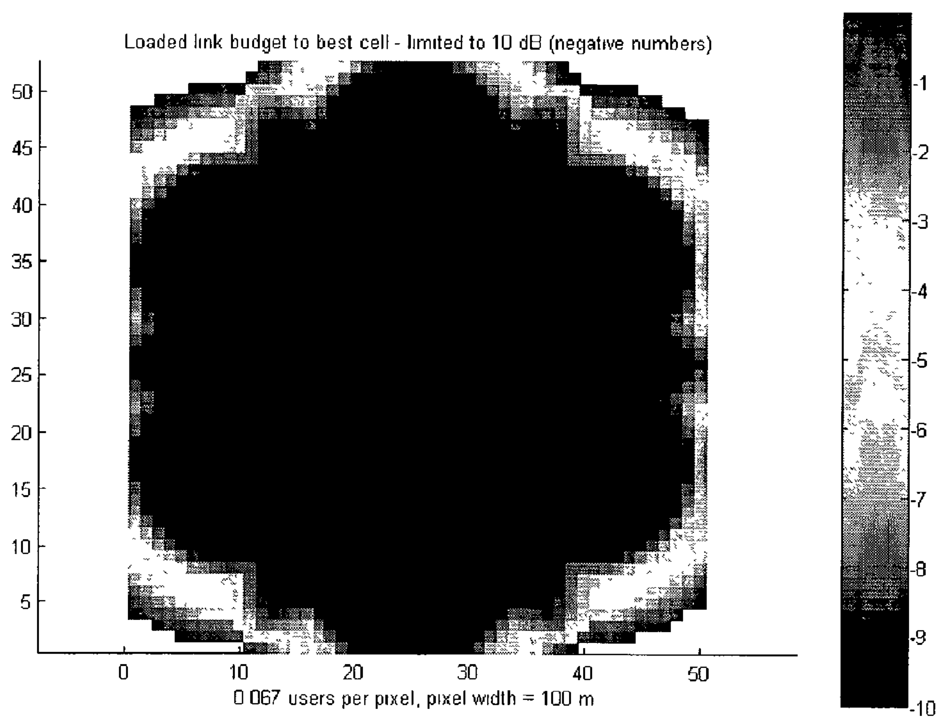

In FIG. 5F the result of the last alternative is shown. In the simulation, the pixel size has been reduced to 100×100 m and the user density has been adjusted so that the number of users per square unit remains the same. The area now has complete coverage and the link budget is uncritical in all pixels within the ring of base stations.

The noise rise and the number of users of the middle cell are summarized in table 5.

TABLE 2

| Statistics for the middle cell | | | |
|---|---|---|---|
| Users per pixel | Pixel width [m] | Noise rise of middle cell [dB] | Number of users in middle cell |
| 0.05 | 150 | 2.12 | 19.85 |
| 0.10 | 150 | 5.85 | 29.50 |
| 0.15 | 150 | 8.34 | 26.55 |
| 0.067 | 100 | 4.27 | 26.60 |

As stated previously the algorithm described above only constitutes an example of an embodiment of the method according to the invention. In this algorithm some assumptions are made, e.g. only one service is used, continuous activity is assumed and only one frequency is used.

If not only one service is used, but several services instead, a reference service can be defined. The numbers of users of other services are then expressed as the equivalent number of users (in terms of average transmission power) of the reference service.

To make it possible to evaluate each service individually and to include the effect of different environments a feature called layers (FIG. 7) can be included in the algorithm. Each pixel has an own set of layers. The only thing the layers have in common is the geographical position and thus also the basic, i.e. outdoor, propagation loss. Any extra loss can be one of the variables that characterize the layer.

For example, one could have one layer for outdoor speech users, another for indoor speech users, and a third for indoor data users, and so on.

Each layer can have a unique set of parameters characterizing the environment and the service for the user in the particular layer.

Furthermore, each layer can have its own traffic distribution. This makes it possible to distribute for example in-car users along roads, and indoor users of high data rates in office buildings, and evaluate those layers individually.

During the evaluation process, each layer of a pixel can be treated like a pixel of its own. With other words, the layers can also be regarded as a set of individual pixels with the same geographical position. With respect to the evaluation process as described before, the evaluation steps when using layers can be as follows.

- During the initial cell assignment, the cell assignment is performed for each layer individually. This means that the maximum possible coverage area may be different for each layer.
- The calculation of soft HO gain and coverage probability is done for each layer.
- In the tables, each layer of a pixel has its own row. The maximum length of the table therefore increases proportionally to the number of layers introduced. Also an extra column is introduced to store the index of the layer.
- The coverage update and the update of soft HO gain and coverage probability are also made for each layer.
- Finally, the evaluation is made for each layer.

Continuous activity of the user terminal is of course not realistic, but merely a matter of definition. The traffic grid should be defined such that the expected average traffic is expressed as the number of continuous-activity users of the reference service.

If several frequencies are used in a cell, the traffic will be divided between the frequencies according to some principle. Because in the example algorithm it is assumed that all users use one frequency, an extension to the multiple frequency case can be made by using several traffic grids, one for each frequency, and perform the algorithm once per frequency. This approach will probably be accurate enough for most situations. More accurateness can be obtained by taking the load on the different frequencies into account and in each iteration adjust the traffic grid for the individual frequencies according to a load sharing mechanism and taking inter-frequency interference into account in a similar manner as inter-cell interference.

It is noted that in the previous discussion cell assignment is performed, i.e. the service area is divided into a grid of pixels after which for each pixel it is determined which cell or cells cover this pixel. The cell or cells covering the pixel under consideration are assigned to these pixels. However, the other way around, i.e. pixel assignment, can be used as well.

It is noted that the radio planning and evaluation algorithm as described above can be applied for other evaluations as well. One might think of evaluating outage probability (uplink and downlink), power headroom (uplink), required power of the user terminal Tx (uplink), best server (downlink), soft and softer handover area (uplink and downlink), throughput (uplink and downlink, soft handover gain (uplink and downlink), etc.

Finally it should be mentioned that the text and the claims often refer to CDMA and/or CDMA radio network. It should be noted however that e.g. in the United States CDMA is used as a name for an IS-95 network instead of the access technology as the term CDMA refers to in Europe. The applicants wishes to stress explicitly that any kind of network having the same properties and/or characteristics with respect to e.g. noise rise as the CDMA radio network discussed in the text and claimed is included in this application.

Power Headroom

Next, the power headroom for each pixel in the network can be calculated, based on the preceding cell assignment and noise rise calculation. The power headroom can be defined as the difference between the maximum transmission power $P_{max}$ of a user terminal and the average transmission power $P_t$ required to obtain a sufficient C/I (the ratio of the carrier power C at the antenna and the interference power I) at the base station.

$$\Delta P = P_{max} - P_t \quad (20)$$

$P_{max}$ is a property of the user terminal and is preferably input to the simulation. $P_t$ depends on the average path loss experienced by the signal to the base station and is calculated for each pixel individually. The power headroom is a measure for the ability of user terminals in a pixel to combat fading effects. Power headroom can be translated into an outage probability for a given type of fading environment. Outage probability, or non-coverage probability, can be defined by two variables, namely the power headroom and the fading standard deviation; together, they form a stochastic variable that is assumed to be normally distributed. This is shown in FIG. 6. In practice the fading margin might be dependent on the clutter type, e.g. indoor or outdoor, rural or urban area. Several types of outage probabilities can be used, e.g. a border or minimum outage probability or a cell-averaged outage probability. The former refers to the maximum realised outage or minimum realised coverage in the cell, with a cell defined by e.g. the non-handover pixels; the latter refers to the perceived outage or coverage when moving through the cell. The latter outage probability can be weighted with the local traffic density or absolute traffic by:

$$\text{outage probability}_{cell\text{-}averaged}(cell\ c) = \frac{\sum_{i \in P_{NHO(c)}} T_i \times \text{outage probability(pixel } i)}{\sum_{i \in P_{NHO(c)}} T_i}, \quad (21)$$

with $T_t$ the traffic, e.g. in Erlang, in pixel i, and $P_{NHO}(c)$ the non-handover pixels belonging to cell c.

Missed Traffic Calculations

The method according to the invention can be used to predict the effects due to errors made in the traffic estimations for the network. These predictions can be advantageously used in the planning of the network by giving a marginal error that is allowed in traffic estimation before correct planning of the radio network fails. To obtain these predictions the following steps can be executed.

1. Assume a given traffic distribution (i.e. number of users in each pixels), a link budget L for each pixel and the noise rise κ for each cell or base station;
2. Change traffic for one or several pixels;
3. Calculate the new noise rise κ' for each cell using this new traffic by applying the method as described previously;
4. Use this new noise rise κ' and re-evaluate the coverage criteria for each pixel resulting in an updated coverage status.

From this routine it will be possible to obtain information on the sensitivity of the coverage status with respect to changes in traffic. By varying the changes sensitive and less sensitive service areas can be distinguished.

What is claimed is:

1. Method for the planning and/or evaluation of a CDMA radio network comprising at least one base station defining at least one cell, the method comprising the steps of dividing at least part of at least one service area of the radio network into pixels;

determining a probability whether or not the at least one of the pixels is covered by the at least one cell;

calculating a link budget L for the at least one pixel and a noise rise κ for the at least one cell of the CDMA radio network's at least one service area; and putting the link budget L for the at least one pixel and the noise rise κ for the at least one cell in a table, the table comprising at least columns or rows referring to the at least one pixel, the link budget L and the noise rise κ.

2. Method according to claim 1 in which the method further comprises the step of assigning the at least one cell to the at least one pixel initially in order to reduce the number of pixels for which the coverage by the at least one cell is to be evaluated.

3. Method according to claim 2 in which the step of assigning the at least one cell to the at least one pixel is performed by using coverage criteria or link budget differences.

4. Method according to claim 1 in which the rows of the table are sorted on the value of the link budget.

5. Method according to claim 1 in which a number of users in the at least one pixel is modified by applying a weight factor to account for the fact that not all users in the at least one pixel can be able to establish a connection to the CDMA radio network.

6. Method according to claim 1 in which the coverage of the at least one pixel by the at least one cell is evaluated by comparing the link budget L calculated for the at least one pixel with the noise rise κ calculated for the at least one cell of the CDMA radio network when loaded.

7. Method according to claim 1 in which the coverage of the at least one pixel by the at least one cell is evaluated by analyzing a function f(L,κ, . . . ) of the link budget L calculated for the at least one pixel and the noise rise κ calculated for the at least one cell of the CDMA radio network when loaded.

8. Method according to claim 6 in which a maximum allowed noise rise $\kappa_{allowed}$ is defined for a cell and used as a criterion to limit the noise rise κ and the number of users in a cell.

9. Method according to claim 1 in which a best service area is included in the calculation of the noise rise κ for the at least one cell to account for inter-cell interference of other cells of the CDMA radio network by $$\kappa_n(N_n) = \frac{1}{1 - \frac{N_n + \sum_{m \neq n} \beta_{mn} N_{m,BSA}}{N_{\max}}}$$

in which $\kappa_n$ ($N_n$) is a noise rise estimate for inter-cell interference, $N_n$ is a number of users, n and m are cell identifiers, $\beta_{mn}$ is a coupling factor, $N_{m,BSA}$ is a number of users in a best server area of a cell, and $N_{max}$ is a pole capacity.

10. Method according to claim 1 in which inter-cell interference of other cells of the CDMA radio network is taken into account by iteratively performing the steps of the method.

11. Method according to claim 10 in which the table is updated at least once during or after the iteration process.

12. Method according to claim 1 in which effects of soft handover are accounted for.

13. Method according to claim 12 in which soft handover effects are accounted for by using an average soft handover gain.

14. Method according to claim 12 in which soft handover effects are accounted for by calculating a soft handover gain on the basis of link budget differences between several cells.

15. Method according to claim 12 in which the contribution of users in soft handover to a number of users in the at least one cell in order to calculate the noise rise κ is modified by applying a weight to these users in soft handover.

16. Method according to claim 12 in which soft handover effects are accounted for by calculating a soft handover gain on the basis of cell load.

17. Method according to claim 12 in which soft handover effects are accounted for by calculating a soft handover gain on the basis of link budget differences and cell load.

18. Method according to claim 12 in which overlapping of other cells of the CDMA radio network with the at least one cell is accounted for in the calculation of the number of interfering users in soft handover in the at least one cell.

19. Method according to claim 1 in which the CDMA radio system comprises at least two cells n and m and the actual coupling factor $\beta_{m,n}$ is obtained from a nominal coupling factor $\beta'_{m,n}$ by $$\beta_{m,n}=\kappa_m/\kappa_n*\beta'_{m,n}$$

where the nominal coupling factor $\beta'_{m,n}$ can be calculated in advance, in which n and m are cell identifiers, and κ is the noise rise.

20. Method according to claim 1 in which the power headroom $\Delta P=P_{max}-P_t$ is calculated for the at least one pixel, in which ΔP is the power headroom, $P_{max}$ is a maximum transmission power, and $P_t$ is an average transmission power.

21. Method according to claim 1 in which an outage probability is determined for the at least one pixel.

22. Method according to claim 21 in which for the outage probability a minimum outage probability or a cell-averaged outage probability is used.

23. Method according to claim 1 in which missed traffic predictions and calculations are made by changing the amount of traffic for the at least one pixel and calculating a change in noise rise after which coverage of the at least one pixel can be re-evaluated and updated if necessary.

24. Method according to claim 23 in which service areas that are sensitive and service areas that are less sensitive to changes in traffic are determined.

25. Method according to claim 24 in which the sensitivity on traffic changes in the service area are displayed by percentages or graphically.

26. System for planning and/or evaluation of a CDMA radio network comprising at least one base station defining at least one cell, the system comprising means for dividing at least part of at least one service area of the radio network into pixels;

means for determining a probability whether or not the at least one of the pixels is covered by the at least one cell;

one or more modules to calculate a link budget L for the at least one pixel and a noise rise κ for the at least one cell of the CDMA radio network's at least one service area; and one or more modules to put results of the link budget and noise rise calculations in a table, the table comprising at least columns or rows referring to the at least one pixel, the link budget L and the noise rise κ.

27. System according to claim 26 that comprises a module to initially assign the at least one cell to the at least one pixel.

28. System according to claim 26 in which a module is provided to sort the table in order to determine the coverage of the at least one pixel by the at least one cell by comparing the link budget L calculated for the at least one pixel with the noise rise κ calculated for the at least one cell of the CDMA radio network when loaded.

29. System according to claim 26 in which a module is provided to sort the table in order to determine the coverage of the at least one pixel by the at least one cell by analyzing a function f(L,κ, . . . ) of the link budget L calculated for the at least one pixel and the noise rise κ calculated for the at least one cell of the CDMA radio network when loaded.

30. System according to claim 26 in which one or more modules are provided to account for inter-cell interference effects on the at least one cell by other cells of the radio network.

31. System according to claim 26 in which a module is provided to iteratively execute the steps of dividing the pixels into layers;

determining a probability whether or not the at least one of the layers is covered by the at least one cell;

calculating a link budget L for the at least one pixel and a noise rise κ for the at least one cell of the CDMA radio network's at least one service area; and putting the link budget L for the at least one pixel and the noise rise κ for the at least one cell in a table, the table comprising at least columns or rows referring to the at least one pixel, the link budget L and the noise rise κ.

32. System according to claim 26 in which a module is provided to account for effects of soft handover.

33. System according to claim 26 in which modules are provided to calculate the power headroom and the outage probability for the at least one pixel.

34. System according to claim 26 in which a module is provided to perform missed traffic predictions and calculations.

35. Computer program for planning and/or evaluation of a CDMA radio network on a computer readable medium comprising at least one base station defining at least one cell, the computer program comprising a module for dividing at least part of at least one service area of the radio network into pixels;

a module for determining a probability whether or not the at least one of the pixels is covered by the at least one cell where the coverage of the at least one pixel by the at least one cell is evaluated by comparing a link noise rise κ calculated for the at least one cell of the CDMA radio network when loaded.

36. Computer program for planning and/or evaluation of a CDMA radio network on a computer readable medium comprising at least one base station defining at least one cell, the computer program comprising a module for dividing at least part of at least one service area of the radio network into pixels;

a module for determining a probability whether or not the at least one of the pixels is covered by the at least one cell where the coverage probability of the at least one pixel is analyzed by a function f(L,κ, . . . ) of the link budget L calculated for the at least one pixel and the noise rise κ calculated for the at least one cell of the CDMA radio network when loaded.

37. Computer program on a computer medium according to claim 35 comprising one or more software modules of the system.

38. Computer program on a computer medium according to claim 35 for running on a computer system, at least including software code portions for performing one or more steps of dividing at least part of at least one service area of the radio network into pixels;

determining a probability whether or not the at least one of the pixels is covered by the at least one cell;

calculating a link budget L for the at least one pixel and a noise rise κ for the at least one cell of the CDMA radio network's at least one service area; and putting the link budget L for the at least one pixel and the noise rise κ for the at least one cell in a table, the table comprising at least columns or rows referring to the at least one pixel, the link budget L and the noise rise κ, when run on the computer system.

39. A computer readable medium, stored with data loadable in a computer memory, said data representing a computer program for planning and/or evaluation of a CDMA radio network comprising at least one base station defining at least one cell, the computer program comprising a module for dividing at least part of at least one service area of the radio network into pixels; and a module for determining a probability whether or not the at least one of the pixels is covered by the at least one cell where the coverage of the at least one pixel by the at least one cell is evaluated by comparing a link budget L calculated for the at least one pixel with the noise rise κ calculated for the at least one cell of the CDMA radio network when loaded.

40. Radio network comprising at least one base station defining at least one cell related to at least one service area in which the coverage of the at least one pixel by the at least one cell is determined by a method for the planning and/or evaluation, the method comprising the steps of dividing at least part of at least one service area of the radio network into pixels;

determining a probability whether or not the at least one of the pixels is covered by the at least one cell;

calculating a link budget L for the at least one pixel and a noise rise κ for the at least one cell of the radio network's at least one service area; and putting the link budget L for the at least one pixel and the noise rise κ for the at least one cell in a table, the table comprising at least columns or rows referring to the at least one pixel, the link budget L and the noise rise κ.

41. Radio network according to claim 40 in which the radio network is a CDMA radio network.

42. Method for the planning and/or evaluation of a radio network comprising at least one base station defining at least one cell, the method comprising the steps of dividing at least part of at least one service area of the radio network into pixels;

determining a probability whether or not the at least one of the pixels is covered by the at least one cell;

dividing the pixels into layers; and determining a probability whether or not the at least one of the layers is covered by the at least one cell.

43. System for planning and/or evaluation of a radio network comprising at least one base station defining at least one cell, the system comprising means for dividing at least part of at least one service area of the radio network into pixels;

means for determining a probability whether or not the at least one of the pixels is covered by the at least one cell;

means for dividing the pixels into layers; and means for determining a probability whether or not the at least one of the layers is covered by the at least one cell.

44. Computer program on a computer readable medium according to claim 35 in which the computer program further comprises a module for dividing the pixels into layers;

a module for determining a probability whether or not the at least one of the layers is covered by the at least one cell.

45. Computer program on a computer readable medium according to claim 36 in which the computer program further comprises a module for dividing the pixels into layers;

a module for determining a probability whether or not the at least one of the layers is covered by the at least one cell.

* * * * *